United States Patent

Hardy et al.

[11] Patent Number: 5,858,032
[45] Date of Patent: Jan. 12, 1999

[54] SOLID FUELS

[75] Inventors: Michael John Hardy, Witham; Eric Dennis Barford, Norwich, both of United Kingdom

[73] Assignee: Advanced Natural Fuels Limited, United Kingdom

[21] Appl. No.: 836,478

[22] PCT Filed: Nov. 2, 1995

[86] PCT No.: PCT/GB95/02578

§ 371 Date: Jul. 14, 1997

§ 102(e) Date: Jul. 14, 1997

[87] PCT Pub. No.: WO96/14372

PCT Pub. Date: May 17, 1996

[30] Foreign Application Priority Data

| Nov. 2, 1994 | [GB] | United Kingdom | 9422111 |
| Jun. 1, 1995 | [GB] | United Kingdom | 9511030 |
| Sep. 4, 1995 | [GB] | United Kingdom | 9518014 |

[51] Int. Cl.$^6$ ................................................. C10L 5/44
[52] U.S. Cl. ............................ 44/522; 44/535; 44/573; 44/576; 44/590
[58] Field of Search ........................................ 44/522, 535

[56] References Cited

U.S. PATENT DOCUMENTS

| 3,635,684 | 1/1972 | Seymour | 44/576 |
| 3,650,711 | 3/1972 | Unick et al. | 44/545 |
| 4,040,796 | 8/1977 | Vincent et al. | 44/519 |
| 4,046,518 | 9/1977 | Dalzell | 44/535 |
| 4,104,034 | 8/1978 | Wu et al. | 44/10 |
| 4,179,270 | 12/1979 | Clayton et al. | 44/541 |
| 4,243,394 | 1/1981 | Kincaid | 44/521 |
| 4,326,854 | 4/1982 | Tanner | 44/377 |
| 4,539,011 | 9/1985 | Kretzschmann | 44/270 |
| 4,883,498 | 11/1989 | MacIsaac | 44/532 |
| 5,393,310 | 2/1995 | Wollen | 44/535 |

FOREIGN PATENT DOCUMENTS

| 130923 | of 1919 | Australia . | |
| 1 585 684 | 3/1981 | Canada . | |
| 730.619 | 8/1932 | France . | |
| 1507206 | 4/1978 | United Kingdom | C10L 5/00 |
| 1585684 | 3/1981 | United Kingdom | C10L 5/00 |
| 2204057 | 11/1988 | United Kingdom | C10L 5/34 |
| 2213829 | 8/1989 | United Kingdom | C10L 5/10 |
| 2240341 | 7/1991 | United Kingdom | C10L 5/14 |
| 2261675 | 5/1993 | United Kingdom | C10L 5/14 |

OTHER PUBLICATIONS

Smoke Authorisation Tests on ANFL Firelogs, CRE Group, Ltd., Report No. FTM 97/111; Dec. 9, 1997.

Smoke Emmission Tests on Four Sample Types of Pressed Woodchip/Vegetable Wax Logs, CRE Group, Ltd., Report No. FTM 97/74; Aug. 14, 1997.

Smoke Emission Tests on a Sample of Pressed Wood Waste Logs, CRE Group, Lt6d., Report No. FTM 96/55; Jul. 8, 1996.

*Primary Examiner*—Ellen M. McAvoy
*Attorney, Agent, or Firm*—Ohlandt, Greeley, Ruggiero & Perle

[57] ABSTRACT

In order to provide a block (1) of solid fuel material which has good burning time, good flame form and a clean flame, the block (1) is comprised of a mixture of solid particulate, cellulosic, organic combustible material, and stearic or palmitic acid together with, optionally, one or more fatty acids or esters. The mixture has a density of from 0.94 to 1.01 gm/cc. The block (1) has a slit (2) extending longitudinally of the block. The slot (2) communicates with a space (3). Combustible gases collect in the space (3) and form a flame at the mouth of the slit (2).

13 Claims, 1 Drawing Sheet

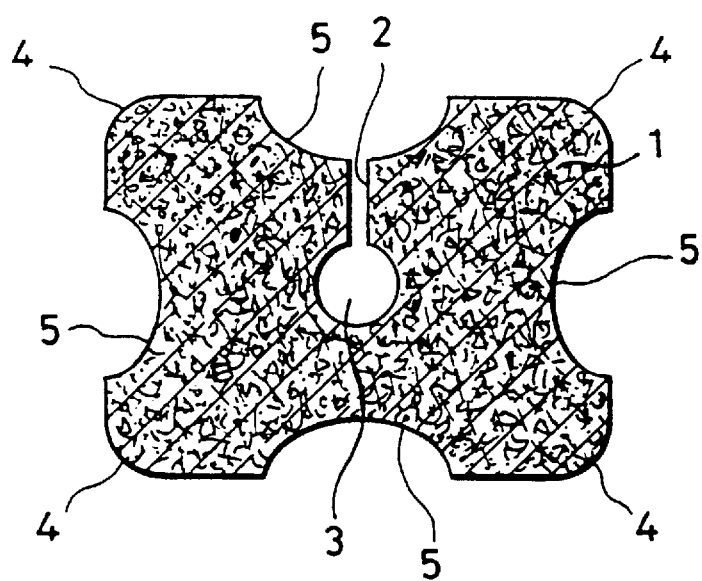

SOLID FUELS

This invention is concerned with improvements in and relating to solid fuel materials and the production thereof. The products are useful as firelighters but may also be used as more conventional fuel materials.

Basically, in accordance with a first aspect of the present invention, a solid fuel material comprises a mixture of
 (i) a solid particulate, cellulosic, organic combustible material, and
 (ii) stearic and/or palmitic acid together with, optionally, one or more other fatty acids or esters; the mixture having a density of from 0.94 to 1.01 gm/cc, preferably 0.95 to 1.00 gm/cc, especially about 0.96 to 0.99 gm/cc.

As noted above, the fuel materials of the first aspect of the invention are composed of two principal ingredients, namely a particulate, cellulosic combustible material and a fatty acid component which serves as binder in the product of the invention and also as a fuel. The first ingredient which may for convenience be termed a "combustible filler", may be any of a wide variety of materials. Examples of suitable organic fillers include forestry residues, sawdust, wood shavings, straw, granulated or comminuted peat, shredded paper, bagasse and like materials.

The particle size of the combustible filler may vary within wide limits and will, to some extent, depend upon the nature of the combustible filler. The particulate organic material is preferably of a particle size such that the material can pass through a 4 mm mesh sieve, preferably a 3 mm mesh sieve. As discussed in more detail below, the moisture content of the combustible filler can be of importance when a preferred method of production of the fuel is employed.

The second basic ingredient (hereinafter referred to as "the fatty acid component") of the fuel material of the first aspect of the invention is one comprising stearic and/or palmitic acid, optionally with other fatty acids or esters. By the terms "stearic acid" and "palmitic acid", we intend, of course, to refer to commercially available materials sold under these names or as "stearine" and which, in practice, comprise mixture of fatty acids in which the nominal acid predominates.

The ratio of combustible filler to fatty acid component should be such that there is sufficient fatty acid present to form a cohesive binder matrix and, to this end, the fatty acid component is preferably present in an amount such that it forms from 40 to 60%, preferably 45 to 55%, of the total weight of the finished product. In addition to serving as a binder the fatty acid component is, of course, also combustible and has been found to give good burning characteristics, especially as compared with a mineral wax.

Other components may be present in minor amounts in the fuels produced in accordance with the first aspect of the invention such as perfumes or other odoriferous agents (e.g. to impart a "pine" smell to the product) or colouring agents. In particular, it has been found that the incorporation of a small amount of a starch (e.g. corn starch) or similar particulate binder provides not only for a tough, well-bonded product but also gives rise to a product having better burning characteristics, i.e. give a fuel block which burns longer with lower flame (the proportion of fatty acid being the same) and give a coherent calcined residue. Such binder is suitably present in an amount of from 2 to 10% by weight of the total components of the fuel, especially about 5% by weight thereof.

A further useful minor component of the fuels of the first aspect of the invention comprises a fire retardant. Such fire retardants must not, of course, be present in amounts sufficient to prevent combustion of the fuel but, when present at low levels below full fire retardant amounts, it has been found that their presence increases the overall burn time without otherwise adversely affecting the performance of the product, eg. as a firelighter or fire log. In particular, it has been found that when used in combination with a binder as discussed above, fire retardants give products which burn to give glowing coals suitable for use, for example, in barbeque applications. Suitable fire retardant materials include inorganic materials such as monobasic ammonium phosphate, dibasic ammonium phosphate and boric acid; and organic materials such as chlorinated paraffins, e.g. those sold under the trade name "Cereclor" by ICI. The amount of fire retardant should, as noted above, be not such as to prevent combustion of the fuel and it is a matter of simple experiment to establish suitable levels of any particular fire retardant. In the use of the ammonium phosphate materials it has been found that levels of up to 2% by weight, eg. 1 to 2% by weight, are suitable.

It has been found important the fuel material of the invention should have a density of from 0.94 to 1.01 gm/cc, in order to impart good burning, especially good flame, characteristics. To this end, it has been found necessary to employ a process of manufacture that involves a compression step. Accordingly, in principle, fuel materials in accordance with the first aspect of the invention are prepared by the steps of forming a mixture of the combustible filler and binder and then compressing the mixture to give a product of the desired density. In practice it has been found convenient to soften or melt the binder before the compression step and, in this case, the binder may be mixed with the filler and the whole mixture then heated to melt or soften the binder or, alternatively, the filler may be added to a previously molten or softened binder. In either case the blend of binder and filler is then thoroughly mixed and the mixture then compressed into product of the desired size and shape and, of course, density. Such final shaping may be effected, for example, by direct compression or by extrusion, preferably the former. The pressure required to achieve the desired density from a molten or softened starting mixture is not too high, e.g. from 40 to 110 psi, preferably from 80 to 100 psi.

Where the above melting process using molten or softened binder is employed, we have found that the moisture content of the particulate filler can be of importance in obtaining a good product. Whilst we do not wish to be bound by any theory, it appears that the total volume of "liquid", i.e. moisture in the combustible filler and molten or softened binder, should be within certain limits, typically 60–70% of the total mixture. To this end, when using, as is preferred, about 50% by weight of binder, the combustible filler should preferably have a moisture content of about 20–35% by weight, especially about 30% by weight. Thus, contrary to what might have been supposed, the presence of some moisture in the combustible filler is of advantage.

The solid fuel material may be formed into any suitable product, such as a firelighter, firelog or barbeque fuel block.

The final product may be formed by any suitable process into any suitable shape. For example, it could be cast, extruded or pressed in a mould. It is preferably extruded. The final product may take the form of individual units or, more preferably, blocks provided with weakening lines to facilitate separation into individual units. It may be formed into prismatic shapes of any suitable cross section, such a circle, square, rectangle or other shape.

Preferably, the cross sectional shape gives a high external surface area to volume ratio (being preferably in the range 0.05 mm$^{-1}$ to 0.5 mm$^{-1}$, preferably around 0.1 mm$^{-1}$). The cross sectional area may have reentrant features in its profile. For example, it may be provided with concave or "scalloped" sections. This provides a high surface area to volume ratio and also allows the blocks to stack stably on one another and on other fuel without slipping. A high surface area to volume ratio allows a relatively high rate of burning and/or higher flames than would otherwise be possible.

The inventors have discovered that particularly good flame form and heating effect can be obtained by the provision of a slit in the solid fuel material block.

According to a second aspect of the invention, there is provided a block of solid fuel material comprising a mixture of solid particulate cellulosic organic combustible material and a binder, wherein at least one slit is formed in the surface of the block.

The slit is believed to provide a surface over or from which evaporation or transport of combustible gases (such as carbonisation products of the cellulosic material or vaporised binder) can occur, the combustible gases passing along the slit to feed a flame. Whilst it is not intended to limit the scope of the invention to the above explanation, the second aspect extends to forms of slit deep and/or wide enough to provide a substantially larger flame than would otherwise be possible. In effect, it is believed that the slit collects combustible material and "pipes" it to the outside of the block. Such combustible gas might otherwise be trapped inside the block and diffuse out slowly, thus giving small flame size.

The term "slit" is used to cover any relatively narrow and deep indentation in the surface of the block, including bore holes, steep sided V-cuts, generally parallel side cuts etc. Preferably, the depth of the slit is greater than its minimum width at the surface of the block, being preferably around 2–4, more preferably around 3 times deeper than it is wide.

A plurality of such slits may be provided extending over one or several surfaces or surface areas of the block.

The slot width is preferably in the range 3–20 mm, most preferably 5 mm. Where the block is extruded, a practical limitation on the smallest size of the slot is provided by strength of the extrusion die. The minimum slot width at the surface of the block is preferably in the range 0.04–0.25, most preferably around 0.07 times the largest the dimension of the block normal to the width of the slit.

Preferably, the slit extends in a plane generally normal to the surface of the block. It may have a depth in the region 10–50 mm, preferably 30 mm. The slit may be in the region of 0.15–0.7, preferably 0.5 times the maximum depth of the block in the plane in which the slit extends.

It is particularly preferred that the slit should communicate with a space of dimension greater than the width of the slit formed within the block. It is found that such a space acts as a collection chamber for combustible gases. The space is preferably of dimension in the range 5–30 mm, preferably around 10–12 mm. It may be in the range 0.06–0.5 times the maximum width of the block, preferably around 0.15 of the width of the block in the plane normal to the plane of the slit. Preferably, the space is located generally centrally in the block. In order to allow good collection of combustible gases and flame height, the maximum distance of any part of the block from the nearest surface of the space or outside surface of the block may be in the region 10–25 mm, preferably around 15–17 mm. It may be in the region 0.15–0.4, preferably 0.25 times the maximum width of the block in the plane normal to the slit.

In a preferred embodiment, there is a longitudinally extending slit. It may communicate with a longitudinally extending space, preferably of circular cross section.

A longitudinally extending slit gives a pleasing and controllable shape of flame extending over a large part of the block.

The slit may be configured to impart a substantial velocity to combustible gases collected by the slit, to give a good form of flame. The area of the slit at the surface of the block may be about 1/5th–1/20th, preferably 1/15th–1/12th of the total internal surface area of the slit and of any space with which the slit communicates in the block.

The cross sectional area of the block may be in the range 1,000–12,000 mm$^2$, preferably 3,000–10,000 mm$^2$, most preferably 5,000–8,000 mm$^2$.

Preferably, the ratio of the cross sectional area of the block in a plane normal to the slit to the cross sectional area of a space communicating with a slit in the same plane is in the region 60:1 to 10:1, preferably 30:1.

The fuel material produced in accordance with the invention is readily ignitable, for example by the application of a simple flame and maintains a fierce flame when burning. Typically, a final product of about 40 gm will have an overall burning time of 18–20 min.

In practice, in a block provided with a slit in a first surface, in which the slit extends from a second surface which meets the first surface to a third surface which meets the first surface, it has been found that the flame may be made to exit the slit from whichever surface is uppermost by a draft effect preventing the flame exiting from generally vertically orientated sides of the block.

The present invention will be further described with reference to the single figure which is a cross section of a solid fuel block according to the first and second aspects of the present invention.

The solid feel material block shown is an extruded block comprised of a solid particulate, cellulosic, organic combustible material and a binder according to the first aspect of the invention. The figure shows the profile of the cross section of the block in a plane normal to the parallel sides of the extruded block.

According to a preferred form the second aspect of the invention, the block 1 is provided with a slit 2 communicating with a circular section chamber 3 formed in the centre of the block.

The profile of block 1 is generally rectangular with rounded edges 4 (which are less prone to damage than sharp edges). Scalloped indentions 5 are provided in each side of the profile. These provide a high surface area to volume ratio for the block. They also allow the block to rest stably on other blocks or fuel when placed in a fire, preventing the block from rolling or falling.

When ignited, an unusually large flame is seen to emerge from the mouth of the slit 2.

In order to obtain the best effect, the block 1 should be placed with the slit 2 pointing upwards or outwards so that the flame exiting the slit 2 can be seen. To this end, the block 1 may be provided with markings to identify its upper surface or in a wrapper which indicates its upper surface.

In order that the invention may be well understood, the following Examples are given by way of illustration only.

EXAMPLE

Example 1

Forest wood residue was chipped to a particulate size such that all passed through a 4 mm aperture sieve.

Fifty parts by weight of the chipped residue was mixed with fifty parts by weight of prilled stearic acid (nominal diameter-1 mm) and the mixture heated to above the melting point of the stearic acid.

The whole was then thoroughly mixed and pressed in 400 gm lots in a hydraulic press under a pressure of about 100 psi. The resultant compressed product had a smooth attractive appearance and burned with a fierce flame.

Example 2

Following the above procedure, except that the mixture was pressed in 425 gm lots, a fuel product was prepared from the following:

stearine 47.5% by wt
woodchip 47.5% by wt (30%) moisture content)
starch 5.0% by wt.

Example 3

Following the procedure of Example 2, a fuel product was prepared from the following:

woodchip (dry) 45% by wt.
palm stearine wax 45% by wt. dibasic ammonium phosphate (20% aq) 10% by wt.

Example 4

Following the procedure of Example 2, a fuel product was prepared from the following:

woodchip (dry) 46% by wt.
palm stearine wax 45% by wt. dibasic ammonium phosphate (20% aq) 5% by wt.
Corn starch 4% by wt.

We claim:

1. A block of solid fuel material comprising a mixture of
   (i) a solid particulate, cellulosic, organic combustible material, and
   (ii) a binder, said binder containing stearic and/or palmitic acid together with, optionally, one or more other fatty acids or esters;
   wherein at least one slit is formed in a surface of said block, and wherein a depth of said slit is in a range of about 0.15 to 0.7 times a maximum thickness of said block measured parallel a plane along which said slit extends.

2. The solid fuel material according to claim 1, the mixture having a density of from 0.94 to 1.01 gm/cc.

3. The solid fuel material according to claim 1, further comprising a starch or similar particulate binder.

4. The solid fuel material according to claim 1, further comprising a fire retardant.

5. The solid fuel material according to claim 4, wherein the fire retardant material comprises monobasic ammonium phosphate, dibasic ammonium phosphate, boric acid, or a chlorinated paraffin, or a mixture thereof.

6. A method of preparing a solid fuel material according to claim 1, comprising the steps of forming a mixture of the combustible filler and binder and then compressing the mixture to give a product density of from 0.99 to 1.0 g/cc.

7. The method according to claim 6, further comprising the step of softening the binder before the compression step.

8. The block according to claim 1, wherein the depth of the slit is 2 to 4 times the minimum width of the slit at the surface of the block.

9. The block according to claims 1 or 8, wherein the slit communicates with a space of dimension greater than the width of the slit formed within the block.

10. The solid fuel material according to claim 2, the mixture having a density of from about 0.95 to 1.01 gm/cc.

11. The block according to claim 8, wherein the depth of the slit is 3 times the minimum width of the slit at the surface of the block.

12. The solid fuel material according to claim 1, wherein said stearic and/or palmitic acid and the one or more optional fatty acids or esters are present in an amount within a range from about 40 to about 60 wt. %, based on the total weight of said material.

13. The solid fuel material according to claim 12, wherein said stearic and/or palmitic acid and the one or more optional fatty acids or esters are present in an amount within a range from about 45 to about 55 wt. %, based on the total weight of said material.

* * * * *